United States Patent [19]

Kerr et al.

[11] Patent Number: 4,772,206
[45] Date of Patent: Sep. 20, 1988

[54] MULTI-MODE TEACHING SIMULATOR

[75] Inventors: Randal H. Kerr, Richford; Robert M. Mesnard, Endicott, both of N.Y.

[73] Assignee: International Business Machines Corporation, Armonk, N.Y.

[21] Appl. No.: 838,083

[22] Filed: Mar. 10, 1986

[51] Int. Cl.⁴ ............................................. G09B 19/00
[52] U.S. Cl. .................................................... 434/118
[58] Field of Search ................. 434/118; 364/200, 900

[56] References Cited

U.S. PATENT DOCUMENTS

| | | | |
|---|---|---|---|
| 3,371,321 | 2/1968 | Adams | 240/172.5 |
| 4,360,345 | 11/1982 | Hon | 434/307 |
| 4,622,013 | 11/1986 | Cerchio | 434/118 |
| 4,637,797 | 1/1987 | Whitney et al. | 434/118 |

OTHER PUBLICATIONS

A. Lakhani et al, Computer-Aided Learning Program, J. Microcomput. Appl. (GB), vol. 7, No. 3-4, 345-7.2. 1984.

D. Atkins et al, The Cardiff Cache System Program, J. Microcomput. Appl. (GB), vol. 6, No. 3, 225-33. 6. 1983.

N. Bevan et al, Design and Evaluation of the Microtext Authoring System for Computer-Based Training, 18.8, 1983.

Primary Examiner—Leo P. Picard
Attorney, Agent, or Firm—Mark Levy

[57] ABSTRACT

A system for presenting material in a tutorial and reference format. The system has a mechanism for capturing, creating and storing data representative of images for display to user and a mechanism for capturing, creating and storing data representative of commands for the user. A driver is connected to the storage mechanism for receiving data and for generating a simulation. The driver has a switching mechanism for selecting between a plurality of operational modes. The switching mechanism can be operated by the user at any time. A presentation device is connected to the driver for receiving and displaying the simulation.

The present invention is useful for many types of subjects, but most useful for learning how to use computer and software (e.g., editors, spreadsheets, word processors).

19 Claims, 17 Drawing Sheets

```
 CMS

VM READ    VM6
 .......1........2.......3.......4.......5.......6.......7........8
```

FIGURE 2a

```
 ISILDEMO SCRIPT  A1  V  132  TRUNC=132 SIZE=0 LINE=0 COL=1 ALT=0

= = = = = * * * TOP OF FILE * * *
          :...+...1...+...2...+...3...+...4...+...5...+...6...+...7...
 = = = = = * * * END OF FILE * * *

= = = = >
                                                         X E D I T   1 FILE
 .......1........2.......3.......4.......5.......6.......7........8
```

FIGURE 2b

```
  ISILDEMO SCRIPT  A1  V  132  TRUNC=132 SIZE=9 LINE=0 COL=1 ALT=0
 INPUT MODE:

* * * TOP OF FILE * * *
 :...+...1...+...2...+...3...+...4...+...5...+...6...+...7...+...

= = = = = > * * * INPUT ZONE * * *

INPUT-MODE  1 FILE
 .......1........2.......3.......4.......5.......6.......7........8
```

FIGURE 2c

```
  ISILDEMO SCRIPT  A1  V  132  TRUNC=132 SIZE=11 LINE=2 COL=1 ALT=2
 INPUT MODE:

* * * TOP OF FILE * * *
 :p.Paragraph
 used like :p.This
 :...+...1...+...2...+...3...+...4...+...5...+...6...+...7...+...

= = = = = > * * * INPUT ZONE * * *
                                                        INPUT-MODE  1 FILE
 .......1........2.......3.......4.......5.......6.......7........8
```

FIGURE 2d

```
Paragraph used like
This

```
ISILDEMO SCRIPT  A1  V  132  TRUNC=132 SIZE=11 LINE=2 COL=1 ALT=2
INPUT MODE:

* * * TOP OF FILE * * *
:p.Paragraph
used like :p.This
:...+...1...+...2...+...3...+...4...+...5...+...6...+...7...+...

=====> * * * INPUT ZONE * * *
                                                    INPUT-MODE  1 FILE
......1.......2.......3.......4......5......6......7......8
```

FIGURE 2f

```
ISILDEMO SCRIPT  A1  V  132  TRUNC=132 SIZE=13 LINE=4 COL=1 ALT=4

* * * TOP OF FILE * * *
:p.Paragraph
used like :p.This
:h1.Head level one
:h2.Head level two
:...+...1...+...2...+...3...+...4...+...5...+...6...+...7...+...

=====> * * * INPUT ZONE * * *
                                                    INPUT-MODE  1 FILE
......1.......2.......3.......4......5......6......7......8
```

FIGURE 2g

```
ISILDEMO SCRIPT  A1  V  132  TRUNC=132 SIZE=15 LINE=6 COL=1 ALT=0
AUTOSAVED AS '100001 AUTOSAVE A1'.

* * * TOP OF FILE * * *
:p.Paragraph
used like :p.This
:h1.Head level one
:h2.Head level two
:h3.Head level three
:h4.Head level four
:....+...1...+...2...+...3...+...4...+...5...+...6...+...7...+...

=====> * * * INPUT ZONE * * *
                                                    INPUT-MODE   1 FILE
.......1.......2.......3.......4.......5.......6.......7.......8
```

FIGURE 2h

```
ISILDEMO SCRIPT  A1  V  132  TRUNC=132 SIZE=17 LINE=8 COL=1 ALT=2

* * * TOP OF FILE * * *
:p.Paragraph
used like :p.This
:h1.Head level one
:h2.Head level two
:h3.Head level three
:h4.Head level four
:h5.Head level five
:h6.Head level six
:....+...1...+...2...+...3...+...4...+...5...+...6...+...7...+...

=====> * * * INPUT ZONE * * *
                                                    INPUT-MODE   1 FILE
.......1.......2.......3.......4.......5.......6.......7.......8
```

FIGURE 2i

```
Paragraph used like

This

HEAD LEVEL ONE

Head Level Two

Head level three
Head level four
            Head level five
            Head level six
.......1.......2.......3.......4.......5.......6.......7.......8
```

FIGURE 2j

```
 ISILDEMO SCRIPT  A1  V   132   TRUNC=132 SIZE=17 LINE=8 COL=1 ALT=2
INPUT MODE:

* * * TOP OF FILE * * *
:p.Paragraph
used like :p.This
:h1.Head level one
:h2.Head level two
:h3.Head level three
:h4.Head level four
:h5.Head level five
:h6.Head level six
:....+...1...+...2...+...3...+...4...+...5...+...6...+...7...+...

=====> * * * INPUT ZONE * * *
                                                         INPUT-MODE    1 FILE
........1........2........3........4........5........6........7........8
```

FIGURE 2k

```
 ISILDEMO SCRIPT  A1  V   132   TRUNC=132 SIZE=21 LINE=12 COL=1 ALT=0
AUTOSAVED AS '100001 AUTOSAVE A1'.
:h1.Head level one
:h2.Head level two
:h3.Head level three
:h4.Head level four
:h5.Head level five
:h6.Head level six
:sl.
:li.item1
:li.item2
:esl.
:....+...1...+...2...+...3...+...4...+...5...+...6...+...7...+...

=====> * * * INPUT ZONE * * *
                                                         INPUT-MODE    1 FILE
........1........2........3........4........5........6........7........8
```

FIGURE 2l

```
HEAD LEVEL ONE

Head Level Two

Head level three
Head level four
            Head level five
            Head level six item1 item2
.......1.......2.......3.......4.......5.......6.......7.......8
```

FIGURE 2m

```
ISILDEMO SCRIPT  A1  V  132  TRUNC=132 SIZE=21 LINE=12 COL=1 ALT=0
INPUT MODE:
:h1.Head level one
:h2.Head level two
:h3.Head level three
:h4.Head level four
:h5.Head level five
:h6.Head level six
:sl.
:li.item1
:li.item2
:esl.
:...+...1...+...2...+...3...+...4...+...5...+...6...+...7...+...

=====> * * * INPUT ZONE * * *
                                                    INPUT-MODE  1 FILE
.......1.......2.......3.......4.......5.......6.......7.......8
```

FIGURE 2n

```
 ISILDEMO SCRIPT  A1  V  132  TRUNC=132 SIZE=26 LINE=17 COL=1 ALT=0
AUTOSAVED AS '100001 AUTOSAVE A1'.
:h6.Head level six
:sl.
:li.item1
:li.item2
:esl.
:ul.
:li.item1
:p.stuff for 1
:li.item2
:eul.
:...+...1...+...2...+...3...+...4...+...5...+...6...+...7...+...

=====> * * * INPUT ZONE * * *
                                                              INPUT-MODE   1 FILE
........1........2........3........4........5........6........7........8
```

FIGURE 2o

```
 ISILDEMO SCRIPT  A1  V  132  TRUNC=132 SIZE=17 LINE=17 COL=1 ALT=0
XEDIT:
= = = = =  :h6.Head level six
= = = = =  :sl.
= = = = =  :li.item1
= = = = =  :li.item2
= = = = =  :esl.
= = = = =  :ul.
= = = = =  :li.item1
= = = = =  :p.stuff for 1
= = = = =  :li.item2
= = = = =  :eul.
           :...+...1...+...2...+...3...+...4...+...5...+...6...+...7...+..
= = = = = * * * END OF FILE * * *

=====>
                                                              X E D I T   1 FILE
........1........2........3........4........5........6........7........8
```

FIGURE 2p

```
Keystrokes entered to get here:

This is a demonstration of the ISIL GML language, and some simple things to do to get started.

To use ISIL (or GML) you must first have familiarity with an editor, and be in a data-set to edit.

Create a data set named ISILDEMO SCRIPT on your 'A' disk, so that we can start reviewing some
basic ISIL tags.

Keystrokes needed for next screen:
xedit isildemo script a1[ENTER]
                                                                                    A:ISIL : Page 1
```

FIGURE 4a

```
Keystrokes entered to get here:
xedit isildemo script a1[ENTER]

This is the standard XEDIT screen, enter input mode so that the ISIL tags and text can be used.

Keystrokes needed for next screen:
input[ENTER]
                                                                                   A:ISIL1 : Page 2
```

FIGURE 4b

```
Keystrokes entered to get here:
input[ENTER]

:p    - This designates the beginning of a new paragraph. It may be used any time that a new
        paragraph is to be started. All text following it will be part of that new paragraph.

Try the :p. command by typing the following text:

:p.Paragraph
  used like :p.This

A:ISIL1 : Page 3
```

FIGURE 4c

```
Keystrokes entered to get here:
:p.Paragraph[CR]used like :p.This[ENTER]

To see what ISIL would do with this type of 'tag', simply press ENTER.

(For real 'scripting' of the ISIL tags, you would have to leave the editor and issue a more
complicated command, but this will be covered later. Suffice now simply to demonstrate the effects
of the ISIL tags on the text.)

Keystrokes needed for next screen:
[ENTER]
                                                                                   A:ISIL1 : Page 4
```

FIGURE 4d

```
Keystrokes entered to get here:
[ENTER]

As you can see, the format of the text file used in XEDIT has little bearing on the format of the
scripted ISIL file.

The :p. tag caused a separation within the text, and a line skip.

To re-enter the editor and see other ISIL tags, just press ENTER.

Keystrokes needed for next screen:
[ENTER]
                                                                              A:ISIL1 : Page 5
```

FIGURE 4e

```
Keystrokes entered to get here:
[ENTER]

Next we will cover headers. Headers are used to set apart logical sequences of similar text. ISIL
allows six levels of headers to be used. The tag for a header is similar to that of a paragraph (:p.),
although the header tag is followed by a number designating its level.

Type the following to become familiar with the use of ISIL headers:

:h1.Head level one
  :h2.Head level two

...and press ENTER
                                                                                ISIL1 : Page 6
```

FIGURE 4f

```
Keystrokes entered to get here:
:h1.Head level one[CR]:h2.Head level two[ENTER]

Now type the next two levels as follows:

:h3.Head level three
  :h4.Head level four

...and press ENTER
                                                                                ISIL1 : Page 7
```

FIGURE 4g

```
Keystrokes entered to get here:
:h3.Head level three[CR]:h4.Head level four[ENTER]

Finally, type the last two levels of headers as follows:

:h5.Head level five
  :h6.Head level six

...and press ENTER
```
ISIL1 : Page 8

FIGURE 4h

```
Keystrokes entered to get here:
:h5.Head level five[CR]:h6.Head level six[ENTER]

Again, to see what ISIL scripted would look like, just press ENTER.

Keystrokes needed for next screen:
[ENTER]
```
ISIL1 : Page 9

FIGURE 4i

```
Keystrokes entered to get here:
[ENTER]

Although difficult to see on-line, a level one head causes a new page to be printed with the header
at the top. A level two head is printed in bold-doublestrike. A level three head is printed in italic-
doublestrike. A level four head is printed in bold. A level five head is printed in italic, in-line with the
text, and a level six is printed italic, text size, in-line with the text.

To return to the editor and see the ISIL tags for lists, simply press ENTER.

Keystrokes needed for next screen:
[ENTER]
```
ISIL1 : Page 10

FIGURE 4j

```
Keystrokes entered to get here:
[ENTER]

There are three kinds of lists in ISIL:
         simple lists
         unordered lists
         ordered lists Simple lists are as they seem, simple. Type the following and you'll see what I mean:

:sl.
 :li.item1
 :li.item2
 :esl.

...and press ENTER
                                                        ISIL1 : Page 11
```

FIGURE 4k

```
Keystrokes entered to get here:
:sl.[CR]:li.item1[CR]:l1.item2[CR]:esl.

:sl.   – designates a simple list
:li.   – designates a list item
:esl.  – designates the end of the simple list To see what ISIL would do with this, just press ENTER.

Keystrokes needed for next screen:
[ENTER]
                                                        ISIL1 : Page 12
```

FIGURE 4l

```
Keystrokes entered to get here:
[ENTER]

As you can see, the list is made under the level six heading (since that is the level last referenced).

To find out more about lists in ISIL, press ENTER.

Keystrokes needed for next screen:
[ENTER]
                                                        ISIL1 : Page 13
```

FIGURE 4m

```
Keystrokes entered to get here:
[ENTER]

There are two kinds of lists left, unordered lists   and   ordered lists.

The tags are similar to the simple list :sl., and :esl., only the list type is different.

Press enter and type the information presented in the Keystrokes Needed area from now on.

Keystrokes needed for next screen:
[ENTER]
                                                                ISIL1 : Page 14
```

FIGURE 4n

```
Keystrokes used to get here:
[ENTER]

Keystrokes used to continue:
:ol.[CR]:li.item1[CR]:li.item2[CR]:eol.[ENTER]
                                                                ISIL1 : Page 15
```

FIGURE 4o

```
Keystrokes used to get here:
:ol.[CR]:li.item1[CR]:li.item2[CR]:eol.[ENTER]

Keystrokes used to continue:
[ENTER]
                                                                ISIL1 : Page 16
```

FIGURE 4p

```
┌─────────────────────────────────────────────────────────────────────┐
│ CMS                                                                 │
│                                                                     │
│ example of mistake here                                             │
│                                                    VM READ   VM6   │
│ ········1·········2····ERROR IN INPUT, PLEASE RE-TRY····6·········7···USER │
└─────────────────────────────────────────────────────────────────────┘
```
FIGURE 6a

```
┌─────────────────────────────────────────────────────────────────────┐
│ CMS                                                                 │
│                                                                     │
│ XEDIT1ISILDEMOtSCRIPTrA1                                            │
│                                                    VM READ   VM6   │
│ ·······1·······2····ERASE ERRORS, LEAVE CORRECTIONS····6·······7···USER │
└─────────────────────────────────────────────────────────────────────┘
```
FIGURE 6b

```
┌─────────────────────────────────────────────────────────────────────┐
│ CMS                                                                 │
│                                                                     │
│ xedit isildemo script a1                                            │
│                                                    VM READ   VM6   │
│ ········1·········2····DISPLAYED IS THE PROPER ENTRY····6········7········8 │
└─────────────────────────────────────────────────────────────────────┘
```
FIGURE 6c

```
┌─────────────────────────────────────────────────────────────────────┐
│ CMOS                                                                │
│                                                                     │
│ xedit isildemo script a1                                            │
│                                                    VM READ   VM6   │
│ ········1·········2····PF5 NOT CORRECT, USE: ENTER····6········7········8 │
└─────────────────────────────────────────────────────────────────────┘
```
FIGURE 6d

MULTI-MODE TEACHING SIMULATOR

BACKGROUND OF THE INVENTION

The present invention relates to a computer simulator and, more particularly, to a multi-mode simulator for use in education.

In the field of education, methods of teaching and learning are continually evolving. Standard education methods presently include classroom lectures—both live and recorded—textbooks, visual aids and even computer aided systems. The latter allows a student to interact with a computer system.

Classroom education is often specific and personal, but must be limited to the number of students that a classroom can accommodate. All students are forced to learn at the pace of the class as a whole. Computer based education, on the other hand, is self-paced and readily available to any number of students. If the course is well conceived, it too can be specific and can simulate the subject matter of the course.

Whether education is performed by standard classroom instruction or through online computer courses, the time required to create the course can be substantial with respect to the time required for an individual student to take that course.

Computer systems that allow users to follow a pre-programmed method of education are known in the prior art. Unfortunately, computer based education has heretofore been difficult to create, often simulating incorrectly and incapable of varying its content depending on the student audience.

U.S. Pat. No. 3,371,321 issued to Adams discloses a computer aided educational system in which student responses change the material that is presented. Thus, depending upon the student's answers to particular questions or decision points, the programmed lesson can vary.

A computer program written by Lakhani et al titled "Computer-Aided Learning" forms the basis of a medical instruction system which is interactive and tutorial in nature. The software package allows medical lecturers to create their own interactive lessons, including color and graphics. The program creates and summarizes grades as students operate the system.

A computer program written by Atkins et al titled "The Cardiff Cache System" is a general purpose computer adided instruction package. It can be used to generate education about a CP/M host system. The system monitors a user's interaction with the system transparently to the user and is used exclusively in a tutorial mode.

A computer program written by Bevan et al titled "Design and Evaluation of the Microtext Authoring System for Computer-Based Training" allows an author to switch between student mode and author mode to run an education program under a frame-structured authoring language.

There has been a need to train students in the operation of equipment and testing apparatus. It has been found that by allowing the student to have a record of his operations performed in the course of learning, these operations can then be used later as reference material which can aid him in the operation of equipment.

No system in the prior art is capable of switching between tutorial and reference modes of operation. In fact, much of the prior art does not show a reference capability at all, much less a switching capability for use therewith.

It would be advantageous to provide a system for allowing a student to control not only his own pace, but also his very style of learning.

It would also be advantageous to provide a system of computer aided education that is task oriented.

It would further be advantageous to provide a system for allowing a user to reference parts of the educational system, once he has used the system in a tutorial mode.

It would also be advantageous to provide a system whereby a user could switch between tutorial and reference modes of operation at will.

It would further be advantageous to provide a system for creating simulations based on data that is supplied by means of visual or instructional storage.

It would also be advantageous to provide a recording mechanism by which images from a computer screen can be captured and used or referenced later.

SUMMARY OF THE INVENTION

In accordance with the present invention there is provided a system for presenting material in tutorial and reference format. The system has a mechanism for capturing, creating and storing data representative of images for display to a user and a mechanism for capturing, creating, and storing data representative of commands for the user. A driver is connected to the storage mechanism for receiving data and for generating a simulation. The driver has a switching mechanism for selecting between a plurality of operational modes. The switching mechanism can be operated by the user at any time. A presentation device is connected to the driver for receiving and displaying the simulation.

BRIEF DESCRIPTION OF THE DRAWINGS

A complete understanding of the present invention may be obtained by reference to the accompanying drawings, when taken in conjunction with the detailed description thereof and in which:

FIGS. 2a–2p represent images displayed on a console in the course of executing a running example;

FIGS. 4a–4p represent instructional text associated with FIGS. 2a–2p, respectively;

FIGS. 6a–6d represent error messages associated with an educational driver;

DETAILED DESCRIPTION OF THE PREFERRED EMBODIMENT

The present system, intended for use in a computer environment, comprises three basic modes of operation:
Education, Testing and Retest Each of these basic modes of operation comprises sub-modes as hereinbelow described. The heart of the system is a SESSION program, the use of which results in a session or time period devoted to performing a specified task in accordance with one of the aforementioned modes of operation. This distinction between the SESSION program and a session (time period) is made herein by the printing convention of capitalizing the former.

Figure 1:
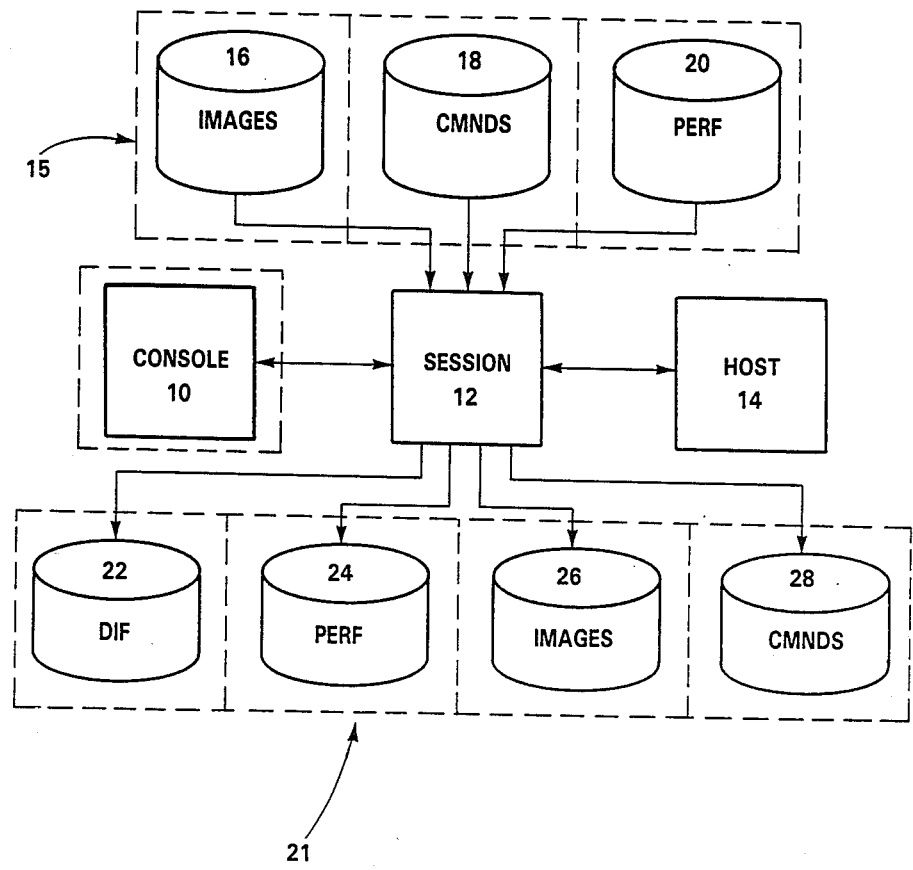
FIG. 1 is a block diagram illustrating the elements in accordance with the SESSION program of the present invention and the data flow therebetween including optional elements.

Referring now to FIG. 1, there are shown the elements of the system in accordance with the present invention including data flow between elements.

A console or so-called smart computer terminal 10, such as a personal computer available from IBM Corporation as Model PC/XT with a data communications adapter card, is adapted to execute a computer program loaded therein. The console 10 includes a display, preferably a high resolution, color cathode ray tube, for displaying alphanumeric characters and graphics. In the preferred embodiment, two display screens are used and are differentiated by the fact that one is capable of displaying information in color while the other is capable of displaying information monochromatically. The display is often herein referred to as a monitor or a screen and the information displayed on it as a screen image. A computer program called SESSION 12 resides in the console 10. The SESSION program has many functions, all capable of being used both independently and in conjunction with one another.

The console 10 can communicate with (i.e., transfer data to and receive data from) a host computer 14. The host 14 is typically a mainframe computer, such as an IBM Model 3081 processor.

Communication among the host 14, the console 10 and various files described hereinbelow occurs by means of the SESSION software 12. A mechanism for allowing such communication between the host computer 14 and the console 10 resides therein. One such a mechanism, commonly referred to as an emulator, is available from IBM Corporation as the PC/VM BOND System.

Connected to the SESSION program 12 are user selectable input files, shown generally as reference numeral 15. For example, an images file 16 contains screen images for use in the system as hereinafter described. Another file 18 stores commands and yet another file 20 stores timing or performance data. These three input files 15 can be used simultaneously.

It should be understood that, although for the sake of simplicity and clarity of description the images file 16, commands file 18 and performance file 20 are shown in FIG. 1 as single files, a plurality of such files can be used with the system of the present invention as conditions warrant. The embodiment described is not intended to limit the scope of the present invention. Any combination of files can be configured depending upon requirements.

A second set of files, called output files and shown generally as reference numeral 21, is provided for receiving data generated by the SESSION program 12. A differences file 22 stores information obtaned when previously stored data is compared to an interactive set of recently generated data. This information is most useful when the operator or the user performs a playback function in the retesting mode, hereinbelow described, but can also be used in the education mode to update screens.

An output performance data file 24 contains a record of the performance or efficiency of both the system and the human user. The performance data file 24 contains timing information that can be accessed at a later time and subsequently analyzed.

An output images file 26 is also accessible by the SESSION program 12 and contains data representative of the screen images that are displayed on the console 10.

An output commands file 28 connected to the SESSION program 12 stores commands that are issued by the operator in the course of a session.

The SESSION Program

The SESSION program 12 can capture both commands and entire screen images. For purposes of understanding, it is helpful to analogize some of the major functions of the present invention to certain functions of an audio or video tape recorder and to use terminology associated with conventional recording functions, such as "record" and "playback." From the point at which the capturing or recording (i.e., mass storage of data at the PC) occurs, one of a number of programs including SESSION itself can be run. These programs are:

EDUCATOR, EDITOR, CONVERT and REVIEW

The human user, not shown in FIG. 1, logs onto a system program that resides in the host 14 via the console 10. The user then accesses, by toggling, the console 10 and begins to execute the SESSION program 12 which has been previously loaded in the console 10. The SESSION program 12 reconnects the user to the host 14 and can be invoked from the PC console 10 via a conventional keyboard, not shown, or via other suitable means.

The word SESSION and appropriate parameters are entered. The syntax for the command SESSION is as follows:

---
SESSION <filename> [.#*s*p*d*n*a vm s# p# d# c#
step saveon/saveoff 0/1 playback mask=n]

--- where the aforementioned parameters, shown in brackets [ ] to indicate that they are optional, represent the following functions:

.#: file level to be used
*s: save a screen images file
*p: save a performance file
*d: save a differences file
*n: overwrite similar file
*a: append to existing file
VM: include VM system checking
s#: use .s extension
p#: use .p extension
d#: use .d extension
c#: use .c extension
step: playback each user command, pausing between them
saveon/saveoff: enter (or do not enter) record mode from first screen
0/1: display system screen on separate monochrome or color monitor
playback: enter SESSION in playback mode
mask=n: user specified ignore character (n) used when building differences file To aid in generating commands to the system, it is most efficient to define certain function keys, not shown, on the keyboard in order to execute particular commands. In the SESSION program 12, these function keys are defined by default as hereinbelow described. It should be understood, however, that any definitions for control keys can be generated by a user in accordance with common PC profiles practice. The following definitions of function keys are default system definitions and have been found to be most useful for generating applications.

| KEYS | FUNCTION | DESCRIPTION |
|---|---|---|
| CTRL-B | BLANK SCREEN TOGGLE | Erases screen image until another CTRL-B restores it. |

-continued

| KEYS | FUNCTION | DESCRIPTION |
|---|---|---|
| ALT-2 | MONO & COLOR | Use both monochrome and color screens. |

The screen that is displayed when help menu is invoked, by typing the keys Ctrl-F1 from within the SESSION program, appears as follows:

| EMULATOR FUNCTIONS | | | | | |
|---|---|---|---|---|---|
| Enter Caps-Lock Clear: Scroll-Lock Reset: Ctrl-Break | | | | | |
| e78 | MVS | | | SESSION FUNCTIONS | |
| Blank Screen: | Ctrl-B | Type Right: | Alt-R | Playback: | Ctrl-P |
| Directory: | Ctrl-D | Type Left: | Alt-L | Quit Play: | Ctrl-Q |
| End Session: | Ctrl-E | Type Up: | Alt-U | Record: | Ctrl-R |
| Instant Save: | Ctrl-I | Type Down: | Alt-D | Step Mode: | Ctrl-S |
| Lock Keys: | Ctrl-L | Mono Only: | Alt-0 | VM Checks: | Ctrl-V |
| Make File: | Ctrl-M | Color Only: | Alt-1 | Wait: | Ctrl-W |
| Note: | Ctrl-N | Mono & Color: | Alt-2 | Exit DOS: | Ctrl-X |

| CTRL-D | DIRECTORY | Lists specified directory mask files. |
|---|---|---|
| CTRL-E | END SESSION | Terminates SESSION program; returns to DOS. |
| CTRL-F1 | HELP | Displays help window defining SESSION keys. |
| CTRL-I | IMMEDIATE SAVE | Copies current screen to screen file on disk. |
| CTRL-L | LOCK KEYBOARD | Inhibits keyboard entry based on password. |
| CTRL-M | MACRO FILE MAKE/END | Toggles start and end of macro (command) file. |
| CTRL-N | NOTE TO SCREEN | Allows a 70 character note to be saved with screen. |
| CTRL-P | MACRO FILE PLAYBACK | Begins execution of command file. |
| CTRL-Q | QUIT A PLAYBACK | Quits execution of playback file, returning keyboard to user. |
| CTRL-R | RECORD TOGGLE | Toggles saving on or off. |
| CTRL-S | STEP MODE | Toggles to playback commands one keystroke at a time. |
| CTRL-V | VM TOGGLE | Specifies that VM system is being used. |
| CTRL-W | WAIT (PLAYBACK) | Toggles to suspend playback temporarily, allowing user input. |
| CTRL-X | EXIT | Exits to PC operating system; returns to SESSION when user types EXIT. |
| ALT-R | TYPE RIGHT | Specifies normal typing. |
| ALT-L | TYPE LEFT | Specifies that cursor moves left after a key is typed. |
| ALT-D | TYPE DOWN | Cursor moves down. |
| ALT-U | TYPE UP | Cursor moves up. |
| ALT-0 | MONO ONLY | Use only monochrome screen. |
| ALT-1 | COLOR ONLY | Use only color screen. |

The SESSION program 12 can be run periodically (e.g., daily) by specifying a general filename at program invocation. This filename can be the current date with the save screens option specified in the event that it becomes necessary to save important information about a session. To save specific information, the Ctrl-M (Make Macro File) option is used and a filename is specified, relating to that information. This enables the user to playback (Ctrl-P) macro files immediately after they are created.

If the filename under which the session is recording is also the general SESSION filename specified at invocation, the file cannot be played back until the SESSION filename is changed, which requires ending SESSION with Ctrl-E and restarting it with a different filename. This is due to the fact that the SESSION file created at invocation is a file opened for output and cannot be used as both input and output. Therefore, it is advisable to use a generic SESSION filename, such as the current date (e.g., AUG27) for routine operation on a day to day basis.

For purposes of understanding, it is helpful to carry a running example forward through this description. The following example is herein presented for explanatory purposes only and is not intended to limit the scope of the invention as defined by the appended claims. The purpose of the following example is to instruct a student on the use of commands in the ISIL language. The use of a system editing program such as XEDIT, as described in "IBM Virtual Machine/System Product: System Product Editor Command and Macro Reference" (Endicott, NY, Second Edition 1982), is required for this example.

The user enters the PC command:

SESSION ISIL*S

Once the user has determined the point at which he would like to begin recording, he enters CTRL-R from the console 10. The system is then in a recording mode. It will capture the keystrokes and—because *S was specified in the original SESSION command—screen images entered henceforth.

After CTRL-R is entered, the initial screen shown in FIG. 2a is recorded on a newly named file, ISIL. To create a VM data set with a filename of ISILDEMO SCRIPT, the user enters the command:

XEDIT ISILDEMO SCRIPT A1.

This statement allows the user to execute the XEDIT system editing program, oblivious to the session interaction that is occurring. The recording session is therefore performed transparently to the user as he merely executes an XEDIT routine and operates in an XEDIT environment. The resulting screen recorded is shown in FIG. 2b.

In this running example, the author creates an education package to teach a student how to use subheadings or headers which are identified by the characters h1–h6. These and similar characters are known as tags. From time to time in this session, as shown in FIGS. 2a–2p, the author presses a console attention key in order to freeze and capture a given screen. He can then continue his session. This repeated use of attention keys is not additional work for an author using SESSION, since in the course of working on a host system attention keys are normally used to get a system response.

The ENTER key is an example of an attention key. Attention keys are normally used to update or refresh the screen. Other examples of attention keys are: CLEAR, PA1, PA2 and function keys F1–F12.

The author next invokes the XEDIT input mode by entering the command INPUT. The resulting screen recorded is shown in FIG. 2c. The next statement entered by the author is:

```
:p.Paragraph [CR]
used like :p.This
``` where [CR] represents a carriage return key. The characters :p. designate the beginning of a new paragraph. All text following these characters are accepted as part of the paragraph. The resulting screen recorded is shown in FIG. 2d.

The next key pressed by the author is merely ENTER. This allows the author to save the previous screen image again for modifying at a later time. Thus, there now exist two copies of the screen image shown in FIG. 2d. By referring to the screen shown in FIG. 2e, a student is later able to see the effect of the ISIL tags on the text. The system screen now appears as shown in FIG. 2f.

The author then types and enters:

```
:h1.Head level one [CR]
:h2.Head level two
```

The characters :h1. and :h2. are used to designate headings or subheadings in text. The number designating the header level can be from 1 thorugh 6. The resulting screen recorded is shown in FIG. 2g.

The author then types and enters:

```
:h3.Head level three [CR]
:h4.Head level four [CR]
```

The resulting screen recorded is shown in FIG. 2h.
The author then types and enters:

```
:h5.Head level five [CR]
```

*-continued*
```
:h6.Head level six
```

The resulting screen recorded is shown in FIG. 2i.

The author again presses the ENTER key to save a duplicate screen image of FIG. 2i so that at a later time he can alter the image to show the effect of the ISIL tags on text to a student, as shown in FIG. 2j.

The system screen now appears as shown in FIG. 2k.

To generate lists, the author enters the following text:

```
:sl. [CR]
:li.item1 [CR]
:li.item2 [CR]
:esl.
```

The characters :sl. designate the beginning of a simple list. Characters :li. identify an item or member of a list. Characters :esl. designate the end of a simple list. The resulting screen recorded is shown in FIG. 2l.

To see the effect of these ISIL tags on the text, the author again presses the ENTER key, resulting in a duplicate screen image to be altered later to yield the screen shown in FIG. 2m. The list (item1 and item2) appears below the level six subheading, as that level is the last one referenced before the list begins. The system screen now appears as shown in FIG. 2n.

The author then types and enters:

```
:ul. [CR]
:li.item1 [CR]
:p.stuff for 1 [CR]
:li.item2 [CR]
:eul.
```

The characters :ul. designate the beginning of an unordered list and :eul. designate the end of an unordered list. The resulting screen recorded is shown in FIG. 2o.

The author then presses ENTER, resulting in a termination of the XEDIT INPUT mode, as shown in FIG. 2p.

When the user is finished recording, he enters CTRL-R to end the recording session. He is, however, still executing the XEDIT system program and can therefore exit normally therefrom, if desired. The user is still also executing the SESSION program even though the recording mode is not being implemented. In order to end the SESSION program, the user types CTRL-E.

While SESSION was running, two files were created: one for the screen images 26 (FIG. 1) and the other for commands 28.

EDITING SAVE SCREEN IMAGES

At this point the author may wish to modify certain screen images previously recorded and may wish to add help text to the atuomatically generated rudimentary instructional text, thereby creating a help file. In order to do this, the editor is invoked with the following syntax:

EDITOR <filename> [s# h# c# 0/1]

The parameters abbreviated above have the same meanings as those described with reference to the SESSION command hereinabove described.

The author now pursues the running example by entering the command:

EDITOR ISIL

In the editor function, certain user definable keys are assigned by default as shown below. It should be understood, however, that the user may define keys and key combinations in many other ways as desired and in accordance with conventional personal computer practice.

Following is a list of keystrokes that are used in the EDITOR program. These keys are all used in conjunction with either the Ctrl (control) key or the Alt (alternate) key. All definitions are in the form:

Ctrl-<key> or Alt-<key> denoting the need to press Ctrl and some other key or Alt and some other key at the same time.

These keys are also defined within the help panel of EDITOR (Ctrl-F1).

| KEYS | FUNCTION | DESCRIPTION |
|---|---|---|
| CTRL-A | ATTRIBUTE SELECT | Type of field of typed characters. |
| CTRL-B | BACKGROUND COLOR SELECT | Background color of field. |
| CTRL-C | COMMAND ENTRY | Allows modification/creation of command file. |
| ALT-C | COPY MARK | Copies marked area to cursor location. |
| CTRL-BACKSPACE | DELETE LINE | Deletes current line from display. |
| CTRL-D | DIRECTORY LISTING | Displays specified directory files. |
| CTRL-E F-3 | END EDITOR | Terminates EDITOR program; returns to DOS. |
| CTRL-X | EXIT EDITOR | Exits to PC operating system; returns to EDITOR when user types EXIT. |
| CTRL-END | TOP OF SCREEN | Moves cursor to top of screen. |
| ALT-F4 | ERASE TO END OF LINE | Erases characters from the cursor to end of line. |
| CTRL-G | GOTO MODE | Puts EDITOR into GOTO mode. |
| F1 | HELP | Displays help window defining EDITOR keys. |
| ALT-J | JOIN LINES | Concatenate text on following line to end of current line. |
| ALT-L | MARK LINE | Tags line for Copy or Move. |
| ALT-M | MOVE MARK | Shift marked area to current cursor location. |
| PGDN F8 | NEXT SCREEN | Moves user to next system/help screen display. |
| PGUP F7 | PREVIOUS SCREEN | Moves user to previous system/help screen display. |
| ESC | SAVE SCREENS | Save help and system screen; display next screen. |
| CTRL-CRLF | SPLIT LINE | Split current line at cursor. |
| F9 | SWAP SCREENS | Change active screen to edit. |
| ALT-U | UNMARK | Untag areas tagged for copy or move. |
| ALT-R | TYPE RIGHT | Specifies normal typing. |
| ALT-L | TYPE LEFT | Specifies that cursor moves left after a key is typed. |
| ALT-D | TYPE DOWN | Cursor moves down. |
| ALT-U | TYPE UP | Cursor moves up. |
| ALT-0 | MONO ONLY | Use only monochrome screen. |
| ALT-1 | COLOR ONLY | Use only color screen. |
| ALT-2 | MONO & COLOR | Use both monochrome and color screens. |
| CTRL-HOME | BOTTOM OF SCREEN | Moves cursor to bottom of screen. |

The EDITOR help screen, invoked by entering F1, is:

| Editor Help | | | |
|---|---|---|---|
| -LINE CONTROLS- | | -MARKING- | |
| Alt-F4: | Erase EOL | Alt-C: | Copy Mark |
| Alt-J: | Join | Alt-L: | Line Mark |
| Ctrl-CRLF: | Split | Alt-M: | Move Mark |
| Ctrl-Backspace: | Delete Line | Alt-U: | Unmark |
| -SCREEN CONTROLS- | | -SPECIAL COMMANDS- | |
| F1: | Help | Ctrl-B: | Background Color Select |
| F3: | Exit Without Saving | Ctrl-C: | Command Entry |
| F7/PgUp: | Show Previous Screen | Ctrl-D: | Directory Listing |
| F8/PgDn: | Show Next Screen | Ctrl-E: | End Editor |
| F9: | Swap Screens | Ctrl-G: | Goto a Screen |
| ESC: | Save Screen and Continue | Ctrl-N: | Note Display on Screen |
| Press any key to continue | | | |

Editor Functions

EDITOR is a screen oriented editing program for use with SESSION created files. EDITOR can be used on the screen file (.S#), help file (.H#) and even the command file (.C#) to modify and/or create new information.

EDITOR places the system screen on the color monitor and the help screen on the monochrome monitor. The editable area defaults to the help screen. On a single screen system, the help screen is displayed; the system screen is accessed by toggling.

EDITOR has many conventional editing features. Areas can be marked, moved and copied and lines can be inserted or deleted. These functions can be performed not only within individual help or system screens, but also between screens.

EDITOR also allows color and attribute information to be defined. Colors—both background and foreground—may be altered and input areas may be defined as well.

Figure 3:
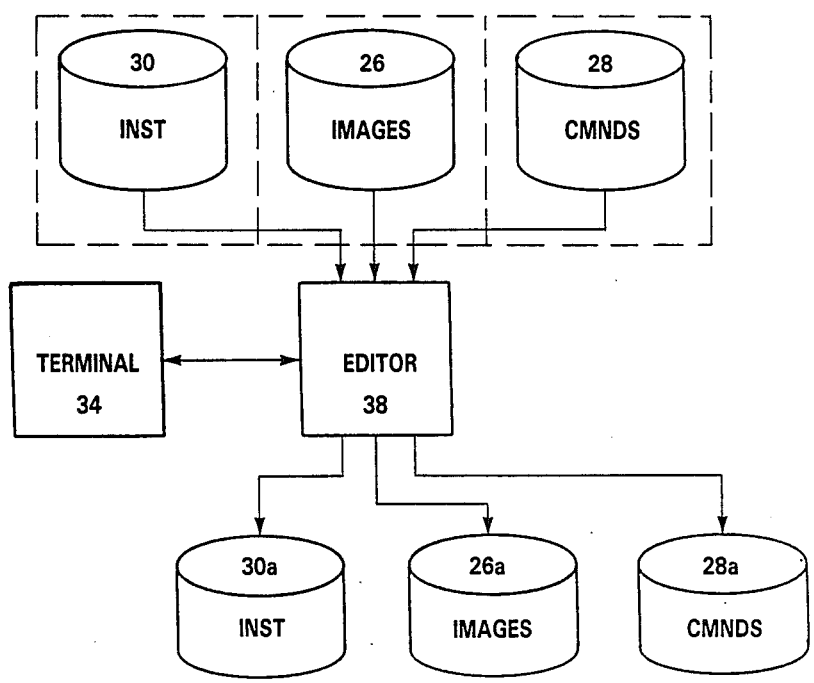
FIG. 3 is a block diagram of configurations of the editor with optional elements.

Referring now also to FIG. 3, there is shown an editor 38 connected to the terminal 34. The files that can be input to the editor 38 are the previously created images file 26, the commands file 28 and the instruction or help file 30.

The editor 38 can generate new images files, shown as reference numeral 26a, commands files 28a and instructions files 30a. the editor 38 can generate any such files 26a, 28a, or 30a either from existing files 26, 28 and 30, respectively, or without reference thereto.

EDITOR can be used regardless of whether screen and command files exist. Although most useful when used in conjunction with SESSION-captured files, it can be used independently from SESSION. The files created or modified with EDITOR can be input to SESSION again or to EDUCATOR.

In human factors testing, EDITOR is the tool of prototyping. Entire systems can be mocked up with the speed of a common text editor. These screens are usable not only as a visual prototype, but as a functional one when accessed by the EDUCATOR program.

EDITOR can be used to document errors. If a captured problem is too big to describe in notes on every screen, EDITOR may be used to create full screen text for the applicable system screens.

EDITOR can also be used to modify test cases (command files), although CONVERT is designed for this purpose, as hereinbelow described.

Although screens and help may be converted for use within any editor, the use of the EDITOR program allows these screens to be created and viewed in the way that they are to be presented. EDITOR can modify both help and system screen files, along with the command file. It is the easiest way to add help to a SESSION-captured education package.

Although not specific for EDITOR, emulation tools can be explained through its use. By using macro files to create screen files, entire methods of operation can be documented and can form the basis of education. Complicated tasks that occur too quickly for education purposes in the macro can be captured (*S while playing back) in SESSION, descriptive text can be added (EDITOR) and the macro can be run at user pace (USER mode in EDUCATOR).

The author now invokes the GOTO mode by pressing CTRL-G. The first screen image that has been recorded in the running example and is to be modified is on page 5 of the images file (FIG. 2e). By typing CTRL-G 5, the author accesses a duplicate image of FIG. 2d. He can then modify that screen using normal editing functions to arrive at an image shown as FIG. 2e. The user now saves this modified version of FIG. 2d by pressing the ESC key.

Referring now also to FIGS. 4a-4p, there is shown a help screen file containing text that is associated with and corresponds to the images shown in FIGS. 2a-2p, respectively. FIGS. 4a-4n represent informational text that was entered during the editing session. FIGS. 4o-4p represent the rudimentary instructional text that is automatically generated by the EDITOR and EDUCATOR programs.

After saving the modified version of the screen image, the system increments to the next screen image. The author may now wish to modify the image that was originally saved as shown on FIG. 2i. To do this, he presses CTRL-G (GOTO) 10. The author can modify the screen of FIG. 2i appropriately. By pressing the ESC key, the modified image is saved as shown in FIG. 2j.

In a similar manner, the duplicate of FIG. 2l which appears on page 13 can be modified, resulting in the screen image shown as FIG. 2m.

Now the educational package is complete. The package can be loaded onto a floppy disk or transmitted, using network capabilities, to any location where the education is to be used. Once received, the educational package can be modified using the EDITOR program to account for site-specific variations.

Education Mode

In the education mode, the system is an automatic authoring tool. The author of the education is the operator who is using the host while executing the SESSION program. Any recorded screens and commands are stored in a way so as to be useful in an education context. By entering the education mode once the SESSION program terminates execution, the captured host session is simulated at PC level in instructional/tutorial format.

Figure 5:
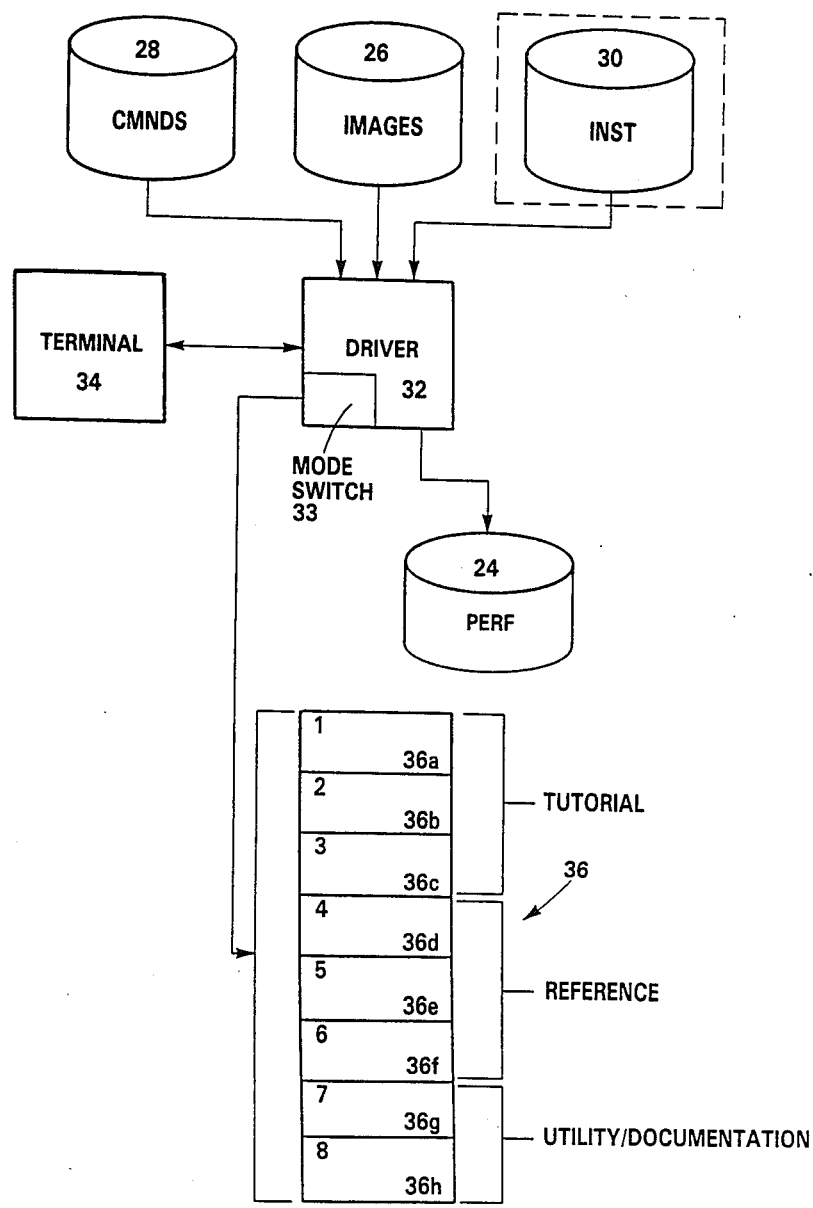
FIG. 5 is a block diagram of the educational driver and modes that can be operated therewith.

Referring now also to FIG. 5, there is shown the education driver system. The images file 26 and commands file 28 have hereinabove been described with regard to FIG. 1. In the running example of the session used to teach ISIL commands, the screen or images file 26 eventually contains a copy of all of the screen images generated during the host session while in the recording mode. These screen images are stored sequentially in a single images file 26. Similarly, the commands file 28 is also generated during the running example session. An instruction or help file 30 is also optionally provided in the educational driver system.

The heart of the educational driver system is an educational driver 32 having a conventional multi-position mode switch 33 residing therein. The computer terminal 34, of which the driver 32 forms a part, is a standard console, not shown, which includes keyboard or other input means for a user to communicate with the program driver 32. Connected to the driver 32 by means of the mode switch 33 are modes, shown generally as reference numeral 36, each of which can be uniquely accessed by appropriate setting of the mode switch 33. In the preferred embodiment, eight modes can be used with the system. Modes 36a-36c are used in tutorial applications; modes 36d-36f are used in reference applications; and modes 36g-36h are utility/documentation modes.

A performance data file 24, similar to that previously created by the SESSION program 12 (FIG. 1), is also connected to the driver 32 for receiving timing data as required. Timing data represents the time interval between an event and a human response thereto via keyboard. The greater this time interval, of course, the less efficient is the human operator.

The educational driver 32 comprises an EDUCATOR program which links the commands file 28, images file 26, and help file 30, if one exists, and presents them in a tutorial fashion.

The EDUCATOR program has operating modes to support tutorials and training, online help, presentations, displays and error documentation.

The EDUCATOR program is an interactive educational tool that authors an educational package for an author or instructor. By using the SESSION program 12 (FIG. 1) to capture the host system 14, the EDUCATOR program can simulate that host system 14 and even supply rudimentary instructional text with no authoring needed. To create a complete education package, the EDITOR program, as hereinabove described, should create screen by screen help text. In the aforementioned running example, such screen by screen help text is generated during the EDITOR session for a portion of the system screens. The remaining system screen have rudimentary instructional text generated by the educational driver 32.

Following is the syntax to invoke the EDUCATOR program

EDUCATOR <filename> [.# s# c# h# mode 0/1]

where the aforementioned parameters, shown in brackets [ ] to indicate that they are optional, represent the following functions:
.#: level of file to use
s#: use screen level file
c#: use command level file
h#: use help level file
mode starting mode; one of USER,STEP-,AUTO,CMND,LIST,GOTO
0/1 force output display onto mono/color.

If .# is not specified in the EDUCATOR command, the system defaults to the highest level for each unspecified file. The parameter level (e.g., .4) sets the default level of files being used to the level specified (e.g., fourth level: s4, c4, h4). When not used, the level defaults to the highest existing level for that type of file—command (.C), screen (.S) or help (.H). The specified level may be a number between 1 and 99.

Separate parameters must be separated from the filename and each other by at least one space.
Example:

EDUCATOR ISIL STEP 1

The EDUCATOR command example shown above allows a user to invoke the EDUCATOR program with respect to the running example.

COLOR ONLY (i.e., output device 1) directs the output of the EDUCATOR program to a color screen when available (e.g., on a two-screen PC). If a two-screen system is being used, it is sometimes useful to place the system screen on one of the displays.

MONOCHROME ONLY (i.e., output device 0) directs the output of the EDUCATOR program to a monochrome screen.

COMMAND FILE (i.e., C#) is a variation of the level parameter that allows specification of a file level for the command file only. Instead of using the latest version command file (the file with the highest value extension), the file with the specified value is used. If the specified file does not exist, the highest existing level command file is used.

HELP FILE (i.e., H#) is also a variation of the level parameter. It allows specification of a file level for the help file only.

SCREENS FILE (i.e., S#) is another variation of the level parameter. It allows specification of a file level for the screens file only.

If the AUTO mode is specified on a two-screen system the system pauses for seven seconds, types in the command, pauses for three seconds and cycles on to the next screen. On a single screen, AUTO mode pauses for two seconds, displays the system screen with the command typed in for three seconds and cycles on to the next screen. When the end of the file is reached, the cycle begins again at the first screen.

If the command mode (i.e., CMMD) is specified, the system waits for the user to type in a command and then searches the list of commands available with LIST mode for an exact match. If no match is found, any command containing the entered string is marked. If only one command is marked, that screen is accessed. If more than one command is marked, a window of the marked commands is displayed as user options. If no commands are marked, a COMMAND NOT FOUND message is displayed.

If the goto mode (i.e., GOTO) is specified, the system displays a window for the user to enter a screen number. The EDUCATOR program branches to the specified screen number. If the number is larger than the size of the education package, the last screen is accessed. The corresponding help screens are linked to the appropriate GOTO-specified screens.

If the list mode (i.e., LIST) is specified, the system displays a window of all the available commands within the education package. Entry type keys are not displayed as commands. The command is displayed with its associated screen number. The list can be scrolled within the window and the commands can be selected. The selected commands are displayed in order of occurrence within the education package. Only one command may be selected per screen. When the screen is displayed, all the commands thereon are also displayed. Thus, selection of only the first command per screen is allowed; the other commands are suppressed.

If the step mode (i.e., STEP) is specified, the system waits for any data key to be pressed. Once pressed, the entire command is typed onto the screen. STEP mode then waits for another data key to be pressed. Once this second data key is pressed, the screen is accessed.

If the user mode (i.e., USER) or if no mode is specified, the system waits for the user to input a correct command and press the correct command entry key. Three chances are given to enter a correct command. Referring now also to FIGS. 6a–6d, on the first error, a message is displayed as shown in FIG. 6a. On the second error, corrections to incorrect characters are made by the system; the user must finish making the indicated corrections shown in FIG. 6b (i.e., erase extraneous characters). On the third error, the proper entry is displayed by the system as shown in FIG. 6c and the next screen is accessed. If, after the user has made all necessary corrections to the command, he enters an incorrect attention key, an additional error message is displayed as shown, for example, in FIG. 6d.

Available keystrokes in the EDUCATOR program are described below. It should be understood that the definition and function of these keys, being arbitrary, can vary in accordance with the designer's requirements or preferences. In the preferred embodiment, a keyboard adapted for use with an IBM personal computer (PC) is hereinbelow described. These keys are all used in conjunction with the control (Ctrl) or alternate (Alt) key. All definitions are in the form:

Ctrl-<key> or Alt-<key> denoting the need for a user to press Ctrl and some other key or Alt and some other key simultaneously.

| KEYS | FUNCTION | DESCRIPTION |
| --- | --- | --- |
| CTRL-A | AUTO MODE | Puts EDUCATOR into AUTO mode. |
| CTRL-HOME | BEGINNING OF PACKAGE | User is placed at beginning of |

-continued

| KEYS | FUNCTION | DESCRIPTION |
|---|---|---|
| | | screen, command and help files. |
| CTRL-C | COMMAND MODE | Puts EDUCATOR into COMMAND mode. |
| CTRL-E | END EDUCATOR | Terminates EDUCATOR program and returns to DOS. All appropriate files closed. |
| CTRL-END | END OF FILE | Moves user to end of education package. |
| CTRL-G | GOTO MODE | Puts EDUCATOR into GOTO mode. Displays window for user to enter screen number. |
| CTRL-F1 | HELP | Displays help window defining EDUCATOR keys. Any key will return to host control. |
| CTRL-F9 | HELP SCREEN | Swaps user from system screen to help and instruction screen. |
| CTRL-PGDN | NEXT SCREEN | Moves user forward to next system/help screen display. |
| CTRL-N | NOTE TO SCREEN TOGGLE | Displays note area associated with system screen at bottom thereof. |
| CTRL-PGUP | PREVIOUS SCREEN | Moves user back to previous system/help screen display |
| CTRL-Q | QUERY MODE | Searches screen file for next note. |
| CTRL-S | STEP MODE | Puts EDUCATOR into STEP mode. |
| CTRL-U | USER MODE | Puts EDUCATOR into USER mode. |
| CTRL-W | WRITE A NOTE | Allows writing of 70 character note to be saved with screen. Displays window near bottom of screen. Once ENTER key is pressed, note is saved with screen. |
| CTRL-X | EXIT | Returns to PC operating system; returns to EDUCATOR when user types EXIT. |
| ALT-R | TYPE RIGHT | Specifies normal typing. |
| ALT-L | TYPE LEFT | Specifies that cursor moves left after a key is typed. |
| ALT-D | TYPE DOWN | Cursor moves down. |
| ALT-U | TYPE UP | Cursor moves up. |
| ALT-0 | MONO ONLY | Use only monochrome screen. |
| ALT-1 | COLOR ONLY | Use only color screen. |
| ALT-2 | MONO & COLOR | Use both monochrome and color screens. |

The EDUCATOR help screen, invoked by entering Ctrl-F1, appears as follows:

| | | |
|---|---|---|
| Ctrl-U | USER mode | interactive learning |
| Ctrl-S | STEP mode | semi-automatic sequence of images; any key to move on |
| Ctrl-A | AUTO mode | automatic sequence of images with time delay |
| Ctrl-G | GOTO mode | jump directly to specified number screen |
| Ctrl-C | CMND mode | command mode, enter any string of characters command file is searched for specific command ENTER key begins search |
| Ctrl-L | LIST mode | select commands from a list of all that exist ENTER key begins displaying those selected |
| Ctrl-N | NOTE mode | read any existing note about the system screen |
| Ctrl-W | WRITE mode | write note commenting about a screen ENTER key writes note to disk |
| Ctrl-F9 | SWAP scrn | single screen systems only; displays help screen |

Ctrl-F7/Ctrl-PgUp = Backward  Ctrl-F8/Ctrl-PgDn = Forward
Ctrl-HOME = First Screen      Ctrl-END = Last Screen
Ctrl-E/Ctrl-F3 = End Program
Alt-0=Mono Only  Alt-1=Color Only  Alt-2=Both Screens
Press any key to return to system screen To run the education software package through the educational driver 32, the user enters the command EDUCATOR and a filename. The filename must be the same name as the previously created education package. In the running example being used for purposes of disclosure herein, the filename is ISIL.

In the preferred embodiment, two screens are used for practicing this invention. The first screen displays screen images sequentially and the second screen displays commands that are invoked in parallel with the screen images. In an alternate embodiment, however, the 0/1 output device parameter can be used in order to display both the screens and the commands on the same terminal or console.

There are two basic modes in the educator driver: a tutorial and training mode; and an online help or reference mode. On a two screen system, the system screen comes up on the color monitor and the help file on the monochrome monitor.

The instructional text or help screen displays information that has been edited in connection with the system screen. Also displayed are the commands needed to be entered on the system screen. In the running example, the first command is XEDIT ISIL DEMO SCRIPT A1. This is the command that the user entered. The typed characters appear on the system screen as they would on the actual host system. Once the user types the command that is required for that screen and presses the correct entry key (ENTER, PF keys or CLEAR), the following system screen is displayed and the instructional text for that screen is also displayed. The system has been captured in the ISIL education package.

As hereinabove described, text FIGS. 4a-4p are associated, respectively, to screen text FIGS. 2a-2p. The user continues operating in this function, typing in the instructions required. The keystrokes needed to enter the instructions need not be specific to the command, but the command itself must be correct.

Also as hereinabove described, levels are provided for the user in case an incorrect command is entered on the screen. FIGS. 6a-6d represent the three error levels provided. On the first error level a message (FIG. 6a) indicates that an error occurred upon input; the user is to retry. When a second error occurs on the same command, any missing or incorrect characters are corrected by the system and highlighted in one color (FIG. 6b). Any characters not needed for the response are highlighted in another color. The user is asked to erase those extraneous characters. On the third incorrect attempt, the correct response is typed onto the screen by the system (FIG. 6c) and a short message is displayed on the bottom of the screen indicating that the correct answer is being displayed.

If an incorrect entry key is pressed (e.g., if ENTER is required and PF5 is pressed), an appropriate message appears at the bottom of the screen (FIG. 6d), instructing the user to use ENTER. The user continues working through the software package to the end of the file, typing the commands requested by the instructional and help text and progressing through the system screens in the simulated system.

In the aforementioned running example, the help/instructional text that was generated using the EDITOR program ends on the screens shown in FIG. 4n. Starting with that screen (FIG. 4n), this screen image is generated by the EDUCATOR program and is called rudimentary instructional text.

The online help mode functions best using the list mode function. This function displays a window on the system screen. In the window is displayed a list of all commands available within this education package. Both the command and the page number on which the command appears are displayed.

This list is fully scrollable and selectable. The user may scan the list, type an S (for "select") in front of any number of items he wishes to see and press the ENTER key. Upon pressing the ENTER key, the system screen and the help/instructional screen relate to the first selected item. The user automatically enters the STEP mode at which time he may press any key and see the command typed onto the system screen, then press any following key and watch the resulting screen. The corresponding help/instructional text screen is displayed concurrently. If more than one item has been selected from the list, upon pressing any key again the next selected screen is moved to the STEP mode. This continues until all items selected from the list have been displayed at which time the user remains in STEP mode.

At any time during this process the user may re-enter list mode to select other screens, de-select previously selected screens or view screens that have already been viewed. Such previously displayed screens are annotated with an asterisk. This sort of online help is called task oriented. It is used to show the user the type of screen on which the command is to be used, the syntax of the command and the probable results of entering such a command.

Online Help Modes of Educational Driver

Most forms of online help taught in the prior art are menu driven, complex and vague. The user does not acquire a thorough understanding regarding the use of the item for which help was sought. Syntax is often described or charted, but actual use is rarely shown or explained. The EDUCATOR program, however, provides online help in a task oriented manner. This is achieved by demonstrating both the syntax and the contextual use of the specified item.

Education packages designed by the present system are more effective if the online help capability is utilized. The education package can thus become more than education; it remains useful even if the user is an expert on the system. The package can always be loaded at the PC level and accessed, by toggling, for reference on a host system problem. Item specific help packages can be designed, for example, to explain all the options of a menu driven system, or how all the tags of a word processor operate. Anything that can be itemized in a list may be the subject of task oriented online help.

Within EDUCATOR the list and command modes are most useful for online help. The list mode displays a window of all available commands in the package. This is a scrollable, selectable list that allows the user to make choices as to the areas for which he wants help.

The command mode is similar to the list mode, except that the list is not shown. Instead, the user types in a string of characters about which he wants information and the list is searched. The search performed in command mode first attempts to locate a perfect match between the user entry and a command on the list, and then attempts to locate a substring match. The effect is the same as in the list mode: the user is shown help for that which was requested. Commands in the list are separated by enter type keys. That is, each selectable command is preceded by and followed by an entry key. Although many items may appear on one host system screen, only one of the items in the list mode is selectable. This is because selection of that one item from the screen causes display of all the other items also.

Alternatives exist for creating education packages. These include:

(a) using EDITOR to create screen and commands instead of SESSION to capture them, as hereinabove described, (b) using CONVERT, as hereinbelow described, to create a command file from a text file and using SESSION to playback those commands, automatically capturing the associated sequence of images, and (c) using any editor to create text files of images and commands using a set of GML-like tags and using CONVERT to create screen and command files for use by the EDUCATOR program.

Test Modes

Testing relates to items that are expected to yield different data with each run, even when repeated or similar sets of commands are used. Two categories of such tests are human factors testing and performance testing. Human factors testing can, in turn, be categorized as either basic or extended.

Basic Human Factors Testing

Basic human factors testing involves the theory of prototyping. The system of the present invention allows rapid prototyping of both screens and commands that are visually meaningful and can also demonstrate function. Once the prototype is complete, it can be shipped to any number of people. Comment can then be gathered from these people before significant coding time is expended on the project. Once the prototype is reviewed and approved, the screens already designed at the PC level can be converted to the appropriate language and uploaded to the host, as hereinbelow described with reference to the CONVERT program, so that the work need not be replaced on the host system ab initio. Screen design itself can be made much simpler this way. The creation of the prototype is done through a full screen editor, bypassing field definition characters and color definitions that require design time of other prototype and most system tools.

Extended Human Factors Testing

Testing in a laboratory environment, gathering timing data and understanding what users do and see are all part of extended human factor testing. This is testing that is performed to determine how usable a product is. The system of the present invention comprises programs having the ability:

(a) to measure the amount of time required for a user to progress from one screen to another, including or not including system delay, (b) to show precisely those keystrokes that a user entered on each screen, and (c) to recreate the entire user experience for viewing or reviewing by others at any time.

Thus, conventional human factors measuring and observing instruments such as stopwatches, audio tape recorders and video cameras are not irreplaceable as they once were. They may be eliminated entirely. Moreover, testing need no longer take place in a laboratory. Testing can be done in the subject's own environment. This means that a much larger audience can be reached, the only requirement being that each user have a PC or similar smart terminal.

The performance chart has the following format:

```
ELAPSED     BETWEEN      TIMESTAMP
TIME        TIME
command: <text of command>
>send:
<back:
command: <text of command>
>send:
<back:
```

The first column starts at time 0:00:00.00 and increases for each command. The second column starts at time 0:00:00.00 for each command and gives the response time of the PC (in >send:) once the host is ready for input and the response time of the host (in <back:) once the PC has finished its input. The third column prints the time of day that the command was issued and responded to.

The first row displays the command. The second row displays the time period required for the PC or user to issue the command. The time is measured from the point at which the host system is ready for input; the ending time is that time at which the user presses an entry key. The third row displays the time period required for the system to respond and to be ready for additional input. The starting time is measured from the point at which the user types an entry key; the ending time is that time at which the host is ready for additional input.

At the end of the performance chart, a printed summary displays the number of commands issued, average (>send:, and <back:) time, longest (>send: and <back:) time, shortest (>send: and <back:) time, and total (>send: and <back:) time.

Performance Testing

Judging system response time at the user's terminal on a system is often a difficult task. To perform the test properly, a person with a stopwatch conventionally observes a terminal operator and times each system response relative to its associated command. This is time consuming and inaccurate. It is also difficult to gather timing information relating to the user.

By using SESSION with the *P (performance chart) option, this information can be gathered and saved without the need of a timer or of extra keystrokes to start and stop a clock. The performance option starts timing from the first system attention key (ENTER, CLEAR, any PF or PA). A timing is taken at the press of one of these keys and another timing is taken when the system returns the messages, Available and Input Not Inhibited. At this point, the user is able to enter data. True end user response times can be determined. As the user enters data the clock continues to run until another system attention key is entered, at which point the timing starts again; a user time is then saved to the .P file. It is preferred, however, to have the PC submit the commands automatically to the system and to gather system response time statistics without user intervention. The means by which this is done is hereinbelow described with respect to retesting.

The .P file holds all timing (performance) information. A summary at the end of the file includes the number of commands, largest system lag time and user entry time, smallest system lag time and user time, total system response time and user input time and average system response time and end user input time. Individual commands are listed in rows and timing information in columns.

The performance chart generated by the system performance test is identical to that generated by the human factors test. Moreover, the events that trigger timings that appear on the performance test performance chart are identical to the aforementioned events with respect to human factors testing.

Retesting Modes

Retesting involves testing of products that have been tested before. If the product has been tested once, some memory of that test is expected to exist. That memory can be the PC's memory. In this way the PC can rerun the test that has been previously performed and can compare the results it gets to those previously received. The PC can also be used to document problems that are found, including where the problem occurred, and can display relevant information repeatedly. Whether the PC is used in a threshold test of a new release against an old one, in an inline test of a product once it has exceeded the performance threshold, or in reporting field errors of the product once it is released and must be supported, the system of the present invention can conduct these tests more quickly and efficiently than can a human tester.

Threshold (Regression) Testing

From release to release, software products change and are upgraded. During these upgrades, however, original functions are still supported and should be tested also. This is often called regression testing and occurs after new functions are tested. By using SESSION, a regression test can become a threshold test of minimum acceptable function that must exist satisfactorily before the product receives human testing. The minimal set of functions are determined by previously run tests of earlier releases. If the SESSION program were used during these initial tests, an automatic test case already exists for the threshold test.

The playback file option of SESSION and the *D parameter are relevant for retesting. The playback option allows SESSION to drive the host system as if a human operator were at the PC keyboard. When the PC drives the system, however, there are no operator mistakes or delay; the PC executes as quickly as the host allows.

The file used to playback to the host is the previously recorded test of the prior release. This represents the test case. By using the *D (differences file) parameter, SESSION not only plays back the commands, but compares the screens on file from the previous run to those that are displayed in playback. Any differences found are saved into the differences file for human review at any later time. Only the differences are saved. If no differences exist for a number of screens, SESSION merely continues to issue commands to the host and to identify differences. Using the running example, a threshold test can be performed by invoking SESSION as follows:

SESSION ISIL*D PLAYBACK

SESSION automatically retrieves the commands previously recorded for the example and detects any differences. The screen file used for comparison is the sequence images file shown in FIGS. 2a–2p before editing.

Figure 7:
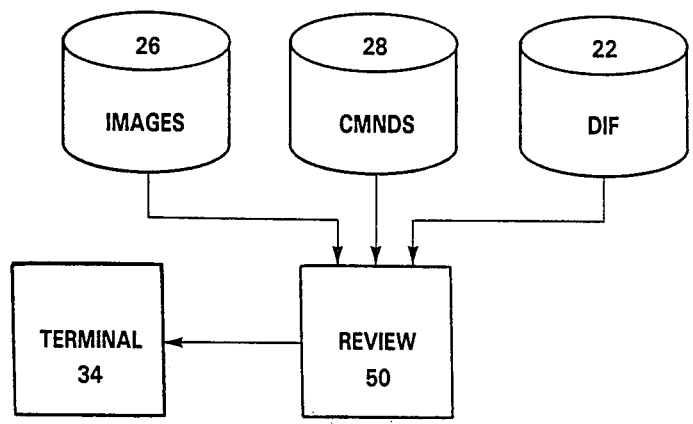
FIG. 7 is a block diagram of configurations for retesting of the present invention.

Referring now also to FIG. 7, there is shown a system configuration used in retesting. Once the threshold test is complete, the differences file 26 can be scanned with a REVIEW program 50. The images file 26 and commands file 28 are also input to the REVIEW program 50. This program 50 shows the original screen from the prior run, then overlays it with the differences found during the current run. These differences are highlighted for easy recognition even in the case of a single character. Extra information is given at the bottom of the REVIEW screen. Such information includes the command used to arrive at that screen, the screen number in the file of original screens and the total number of screens that had differences.

Review Mode

The REVIEW program allows the user to see the data that was handled by the console after it played back a file with the *D (differences file) option in SESSION. The original user session is displayed and the differences in the session found by the PC are overlayed on the original. The user can toggle between the original session and the PC run session, seeing only those screens that were different in the two runs.

REVIEW also allows the user to see only differences on PROTECTED (non-input) or UNPROTECTED (input) fields. This way certain characteristics of different systems can be masked and the possible differences ignored. EDITOR also allows the creation of mask characters on the original user-captured screens. These mask characters are ignored by SESSION so that any differences occurring in those physical screen positions are subsequently ignored during the playback.

The REVIEW program 50 resides in the terminal 34 and can be invoked thereby. The images file 26, the commands file 28 and the differences file 22, all created by the SESSION program 12 (FIG. 1) can be input to the REVIEW program 50 separately or in any combination for processing. REVIEW is dependent on SESSION being run in playback mode with the *D (save differences) option. The toggle in REVIEW from original screen to different screen occurs relatively slowly the first time; it is immediate all following times. Thus, on screens with major differences, the differences do not suddenly appear but are painted onto the screen.

The REVIEW command has the following syntax:

REVIEW<filename>[.level][asterisks][separates]

Level is similar to a file extension in DOS. It sets the default level of files being used to the level specified. When not used, the level defaults to the highest existing level for that type of file (.C, .S and .D). The specified level may be a number from 1 to 99. Asterisk parameters must follow the filename immediately with no separating spaces. Separate parameters must be separated from the filename and each other by at least one space.

COLOR ONLY forces REVIEW to the color screen when using a two screen PC.

Example: REVIEW testfile*1

If a two screen system is being used, it is sometimes useful to place the system screen on one display or the other. *1 forces the program REVIEW to use only the color screen. The monochrome display is left free.

MONOCHROME ONLY forces REVIEW to the monochrome screen when on a two screen console system.

Example: REVIEW testfile*0

In establishing a command file, a user-specified command file extension number is used.

Example: REVIEW testfile c5

This parameter is a variation of the level parameter that allows specification of a file level for the command file only.

A user specified differences file extension number is used to create a diffrences file.

Example: REVIEW testfile h5

This parameter is also a variation of the level parameter that allows specification of a file level for the differences file only.

The protected only function is invoked by the letter P. REVIEW displays only those differences found on protected fields.

Example: REVIEW testfile p

Any differences found on a protected field will be displayed. All others (unprotected fields) are not displayed as differences.

SESSION can also be executed with this option while the differences (.D) file is being created, in which case the differences file contains only protected field differences. Otherwise, SESSION saves all differences and REVIEW must be invoked to purge them.

The QUIET function turns off most of the pre- and post-program logos and sound.

Example: REVIEW testfile q

Any logos at program start and end are suppressed, along with the typomatic sounds of the logos. If q is specified from the filename menu of the program, only the program ending logo is suppressed, as the initial program logo has already been displayed.

The unprotected only function is invoked by the letter U. REVIEW displays only those differences found on unprotected fields.

Example: REVIEW testfile p

Any difference found on a unprotected field will be displayed. All others (protected fields) are not displayed as differences.

SESSION can also be run with this option while the differences (.D) file is being created, in which case the differences file contains only unprotected field differences. Otherwise, SESSION saves all differences and REVIEW must be invoked to purge them.

A user specified screens file extension number is used to select a screens file.

Example: REVIEW testfile s5

This parameter is also a variation of the level parameter that allows specification of a file level for the screens file only.

In the preferred embodiment, the following control (Ctrl) key combinations have been found to be most useful:

| KEYS | FUNCTION | DESCRIPTION |
|---|---|---|
| CTRL-HOME | BEGINNING OF FILE | Moves user to beginning of differences in files. |
| CTRL-E F3 | END REVIEW | Terminates F3 REVIEW program and returns to DOS. |
| CTRL-END | END OF FILE | Moves user to end of all files. |
| CTRL-PGDN CTRL-F8 | NEXT SCREEN | Moves user to next differences display. |
| CTRL-PGUP CTRL-F7 | PREVIOUS SCREEN | Moves user to previous differences display. |

Once the test is reviewed, the human tester can make the decision as to whether the differences found were also errors.

Automatic Testing

Automatic testing deals with those tests that are performed after the threshold tests are complete. The developed code is in the hands of the human tester who is responsible for exercising the new function. So long as he is operating under SESSION and saving at least the commands, his job can be made much easier.

SESSION allows the saving of commands and screens so that the human tester can easily replay entire series of steps. Once a tester finds an error and the error is corrected by the developer, the code must be retested to ensure the repair. This retest should be an exact duplicate of the steps that caused the original error. These series of commands are often difficult to remember and time consuming to repeat. It is also difficult for the human tester to know if any other changes have occurred on the path toward the original error.

SESSION replays the exact series of keystrokes leading to the original error and—when run as it was in threshold testing—also notes differences that have developed up to that point in the test. In automatic testing, SESSION can be used to reduce the drudgery and repetition of the tester's activities.

Convert Mode

CONVERT is a translation program that changes files created by SESSION into human-readable form. CONVERT can also change human-readable files into SESSION-readable form.

Figure 8:
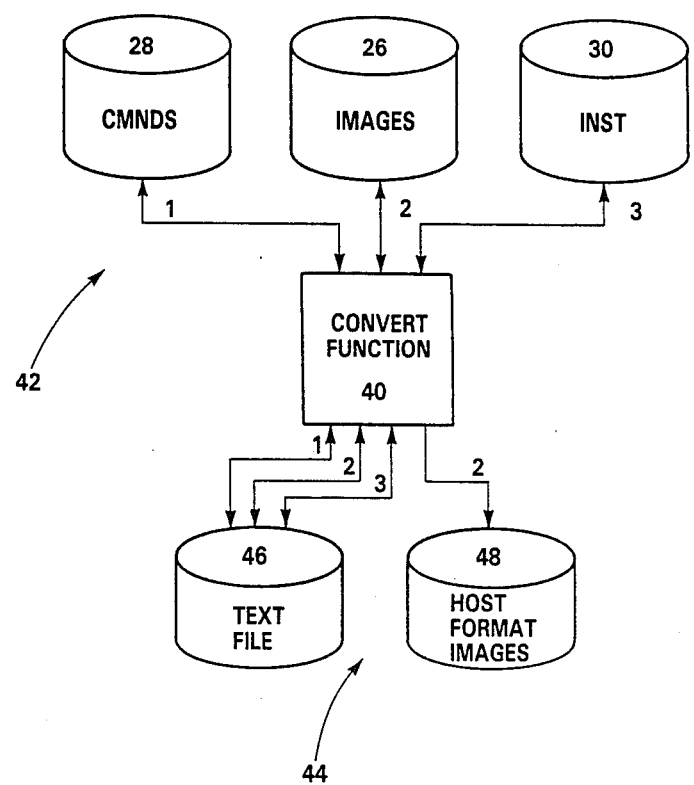
FIG. 8 is a block diagram of the convert function in accordance with the present invention.

Referring now also to FIG. 8 there is shown the convert function 40, to which is connected the images file 26, the commands file 28 and the instructions file 30, cumulatively referred to as saved session files and identified by reference numeral 42. Three text files 46 and a host format images output file 48 form human-readable files referred to generally as reference numeral 44.

Human-readable files 46 can be edited with any PC editor. Using the command language, new commands can be inserted, old ones deleted, the file expanded, contracted or even used to create an entirely new file. CONVERT 40 must be executed once again to make the file usable by SESSION.

A command file can be created in either of two ways. The first is by recording the command file using the SESSION program. The user issues a begin task definition command within SESSION (Ctrl-M). The interactive task is then performed normally. When the task is completed an end task definition command (also Ctrl-M) is entered, which causes the originally specified task to be saved as a command file. The second way to create a command is simply to use an editor to create a list of commands as previously defined. This list is then processed by the CONVERT program which makes an executable command file.

The files 42 converted back into SESSION format are syntax checked and logic checked. This is similar to compiling a Basic or Pascal program. In the present context, the compiling analogy relates to files that contain commands, both SESSION-readable and human-readable. Errors are flagged and, depending on their severity, the conversion continues or ends. The file is placed into SESSION format and given the highest existing extension number (i.e., .C number, .S number or .H number) plus one, so that no files are overwritten.

One of the advantages of using CONVERT on command files is that the language it supports allows more than the emulator keys that SESSION can capture. This allows a command file to accomplish a more generalized task than the command file was originally created to do. Since a type of compilation is done on the file, looping controls are supported as are screen searches, saves and variable parameters. Some of these language commands simulate keys that are defined to SESSION; others are defined to the language alone. Although SESSION cannot capture special language controls when recording, it can understand the controls when they are built into the command file.

The compile that is performed when the human-readable file is made SESSION-readable is a type of corrective compile. Only when the problem is compiled past the point of a correction or the problem is too severe, does CONVERT abort the compile. But if an error is found that can be corrected during the compile, it is corrected.

CONVERT inserts necessary commands, if possible, to satisfy requirements of SESSION if such commands were omitted. These added commands are noticeable when the SESSION-readable file is converted back to human-readable, having been originally converted from human-readable form. This operation is useful for debugging command language files because the commands that the compiler changes become evident. It is recommended that any such twice-converted files be inspected carefully and not converted a third time.

In operation, the CONVERT program 40 can convert the commands file 28, the images file 26 or the instruction file 30 or any combination thereof into the text files 46. Moreover, the images file 26 can be converted by the CONVERT program 40 into the host format images file 48.

To invoke the CONVERT program 40, the following syntax must be used:

CONVERT <filename> [fromc toc] [c#] [nonum]

where the aforementioned parameters, shown in brackets [ ] to indicate that they are optional, represent the following functions:

| fromc toc | direction of conversion |
|---|---|
| c# | level of file to convert |
| nonum | without cursor location |

CONVERT can be used to create a command file, to modify one, to generalize one or even to make one a repeating self contained host session.

Error Reporting

Error reporting is a process in which testers and users document problems for the code developer to consider and to eliminate, if possible. Conventional methods of documentation are often poor a representation of the system. This leads to long delays before corrections are effected, confusion as to what the problem is and the need for extra communication beyond the documented error in an attempt to determine the problem. Moreover, since users may not remember the exact sequence of steps that were used in discovering the errors, the error is often incorrectly documented and considered invalid by the developer.

By using SESSION, an exact record is kept of the terminal session. This record includes not only commands, but entire screen displays seen by the user as well as a single line of text that the user can add contemporaneously to further describe his actions leading to the problem. This is accomplished by the NOTE TO SCREEN function hereinabove described. An entire page or screen of user specified text can be entered after the session is complete using the EDITOR program. With this documentation, the developer sees not only the commands that the user entered, but the time at which the user entered them, what he saw and what he was thinking at the time.

Reconfigurable Automatic Tasking System

SESSION, as an emulator overlay, can allow features to exist that the normal emulator alone cannot allow.

Macros are similar to .BAT files at the PC level, or CLISTS or EXECS on the host system. By using SESSION and simply recording a series of commands, a macro can be created. This macro can be played back at any time, reducing repetitive or difficult keystrokes to a macro file name.

In the preferred embodiment, the following commands form a set that includes all commands that can be captured by the keyboard as well as additional commands that can make the macro more flexible or reconfigurable, as hereinbelow discussed.

Keyboard Functions
[INSOF]
[INSON]
[PRTSC]
[ENTER]
[TR]
[EEOI]
[EEOF]
[HOME]
[B]
[TAB]
[BTAB]
[U]
[D]
[CR]
[R]
[L]
[END]
[PF1]
[PF2]
[PF3]
[PF4]
[PF5]
[PF6]
[PF7]
[PF8]
[PF9]
[PF10]
[PF11]
[PF12]
[PA1]
[PA2]
[CLEAR]
[DEL]
[RESET]
[BEEP]
Variable Parameters
[%0]
[%1]
[%2]
[%3]
[%4]
[%5]
[%6]
[%7]
[%8]
[%9]
Time Stamp
[T]
Find String Delimiters
[F+]
[F−]
Do If Found
[+F]
Do If Not Found
[−F]
Wait Until CTRL-W
[WAIT]
Pause Until Any Key is Struck
[PAUSE]
Begin and End
[+]
[−]
Command File Name Delimiters
[C+]
[C−]
Stop and Keep Session Going By Repeating Enters
[HOLD]
[STOP]
Labels for GOTOS
[:0]
[:1]
[:2]
[:3]
[:4]
[:5]
[:6]
[:7]
[:8]
[:9]
GOTO Commands
[G0]
[G1]
[G2]
[G3]
[G4]
[G5]
[G6]
[G7]
[G8]
[G9]
No Operation
[NOP]

Delay Specified Period of Time
[DELAY]
Special Checking For System In Use
[VM]
[MVS]
Password Delimiters
[L+]
[L−]
Enable/Disable Screen
[BLNK+]
[BLNK−]
Specific Cursor Location
[GOXY]
[SNAP]
[OLDXY]
[(*]
[*)]
[TYPER]
[TYPEL]
[TYPEU]
[TYPED]
Reset GOTOS
[R0]
[R1]
[R2]
[R3]
[R4]
[R5]
[R6]
[R7]
[R8]
[R9]
[READ]
Local Variables
[VAR0]
[VAR1]

[VAR2]
[VAR3]
[VAR4]
[VAR5]
[VAR6]
[VAR7]
[VAR8]
[VAR9]
Uppercase/Lowercase
[CAPON]
[CAPOF]

Assign Values to Variables
[SET0+]
[SET1+]
[SET2+]
[SET3+]
[SET4+]
[SET5+]
[SET6+]
[SET7+]
[SET8+]
[SET9+]
[SET−]
Erase Lead and/or Trail of Local Variable
[STRIP]

Macros can also be written instead of recorded, or altered once recorded, by using CONVERT and the command language. The command language allows conditionals, loops, writes to disk, variable parameters and many other functions that could not be duplicated merely by recording. The command language therefore allows powerful macros to be built that can process indefinitely. Once created or modified, the editable form of the macro (a .CMD file) is then executed under the CONVERT program. This places the file in SESSION-readable from (.C# file). The file can be exercised under CONVERT any number of times until even the most complex macro is correct.

The following macro file is an example of a simple macro into which additional commands have been inserted to allow the file to update a whole series of host files automatically. FIND, GOTO and looping commands allow the macro to be more flexible than a conventional macro, in that the macro can react appropriately to changing system conditions.

This file is designed to use XEDIT (on VM) to update a series of files automatically.

```
[:0]   [PF4][(*] select a date set from fulist                              [*)]
       [ENTER][(*] ensure past the profile selection                        [*)]
       SET HEX ON[ENTER][(*]allows searching for string                     [*)]
[:1]   /X'4B9789405A7BE2'[ENTER][(*] find .pi !#S                           [*)]
       [F+]/X'4B9789405A7BE2'[F−]
       [+F][G2][30]
[−F]   [U][U][U][U][U][U][U][U][U][U][U][BTAB]C[END][END][END]P[ENTER]
       [(*] copy the line down, make the original line
       wrap-able, insert the information, move to copied
       line and delete the #s                                               [*)]
       [U][U][BTAB]E[ENTER]
       [GOXY][1:24][U][U][U][U][U][U][U][U][U][U][U][U][TAB]
       [INSON].if X&testman.=X4 [INSOF][ENTER]
       [U][U][U][U][U][U][U][U][U][R][R][R][R][R][DEL][DEL][ENTER]
       [G1][1000]
[:2]   [EEOF]FILE[ENTER][(*] save file and see if more                      [*)]
       [D]
       [GOXY][19:3]
       [F+]Al[F−]
       [+F][HOME][D]/[ENTER]
       [−F][STOP][NOP]
       [GO][30]
```

Emulation

CONVERT can be used to generalize macro files, create long running and/or repetitive tasks, simplify daily operations and customize the way that the user interacts with the host system. A macro file may be captured with specific inputs, such as data set names, and later converted to variable parameters. Long running and repetitive tasks can be executed by entering a few keystrokes with a looping or branching macro. Finally, CONVERT can be used to make the host appear to accept parameters with a command or automatically save a data set when editing is complete. For example, a command file to edit a data set and have it saved when editing is complete may appear as follows:

```
[CLEAR]
EDIT [%0] [ENTER]
[WAIT]
[HOME]SAVE[ENTER]
[HOME]QUIT[ENTER]
```

To use the host editor now, the keystrokes would be:

```
Ctrl-P
EDIT MY-DATASET
```

MY-DATASET now occupies the [%0] position and the system is in the editor in WAIT state. When editing is complete, the user can press Ctrl-W to save the file, exiting the editor.

The present invention is particularly directed to use in a host/personal computer system which will employ varying features and functions, described in differing aspects, in any one or more of the following group of copending patent applications, which includes the present application, all filed concurrently: Ser. No. 838,083 for "MULTI-MODE TEACHING SIMULATOR"; Ser. No. 838,085 for "SYSTEM FOR TESTING HUMAN FACTORS AND PERFORMANCE OF A SYSTEM"; Ser. No. 838,239 now U.S. Pat. No. 4,696,003 for "SYSTEM FOR TESTING INTERACTIVE SOFTWARE"; and Ser. No. 838,062 for "RECONFIGURABLE AUTOMATIC TASKING SYSTEM".

Since other modifications and changes varied to fit particular operating requirements end environments will be apparent to those skilled in the art, the invention is not considered limited to the example chosen for purposes of disclosure, and covers all changes and modifications which do not constitute departures from the true spirit and scope of this invention.

What is claimed is:

1. A system for presenting material in a tutorial and reference format comprising:
   (a) a host environment from which data representative of images and commands is gathered ab initio;
   (b) first means for storing data representative of images for display to a user;
   (c) second means for storing data representative of commands for said user;
   (d) a driver operatively connected to said first and second means for receiving data therefrom and for generating a simulation, wherein said simulation represents the re-creation of relevant elements in said host environment, said driver having switching means for selecting from among a plurality of operational modes, said switching means being operable by said user at any time; and
   (e) presentation means operatively connected to said driver for receiving and displaying said simulation.

2. The system in accordance with claim 1 wherein said driver is accessed by a user to effect said presentation means.

3. The system in accordance with claim 1 further comprising:
   (e) editing means operatively connected to said first and second data storage means for editing data stored therein.

4. The system in accordance with claim 1 further comprising:
   (e) an interactive host computer for storing and executing software that is the subject of an educational package created by said driver; and
   (f) a terminal operatively connected to said host computer for initiating execution of host-resident software and said educational package.

5. The system in accordance with claim 4 further comprising:
   (g) means for capturing said images operatively connected to said first and second data storage means and to said terminal for storing data.

6. The system in accordance with claim 5 wherein said terminal is a smart terminal.

7. The system in accordance with claim 4 wherein said terminal comprises hardware and software, said software including a data transfer manager for transcribing data to and from said host computer.

8. The system in accordance with claim 7 wherein said data transfer manager allows switching between terminal emulation and local modes at any time.

9. The system in accordance with claim 1 wherein at least one of said operational modes allows said user to access randomly any portion of said data stored in said first or in said second storage means.

10. The system in accordance with claim 1 wherein said NOTE operational mode allows said user to annotate data representative of an image.

11. The system in accordance with claim 10 wherein said QUERY operational mode allows said user to search data representative of images for said annotation.

12. The system in accordance with claim 1 wherein one of said plurality of operational modes is a USER mode in which said user introduces a host command to said simulation and observes a simulated response thereto.

13. The system in accordance with claim 1 wherein one of said plurality of operational modes is a STEP mode in which said user executes said simulation in discrete steps.

14. The system in accordance with claim 1 wherein one of said plurality of operational modes is an AUTO mode in which said simulation is executed at a predetermined rate of speed without human intervention.

15. The system in accordance with claim 1 wherein one of said plurality of operational modes is a LIST mode in which a list of said commands is displayed to said user for selection thereof and subsequent simulated response thereto.

16. The system in accordance with claim 1 wherein one of said plurality of operational modes is a CMND mode in which said user introduces one of said commands to said simulation for processing thereby.

17. The system in accordance with claim 1 wherein one of said plurality of operational modes is a GOTO mode in which said user accesses one of said images by random access.

18. The system in accordance with claim 1 wherein one of said plurality of operational modes is a NOTE mode in which said user annotates said simulation at a location corresponding to one of said images for subsequent display therewith.

19. The system in accordance with claim 18 wherein one of said plurality of operational modes is a QUERY mode in which said user searches for one of said images with which an annotation is associated.

* * * * *